Jan. 6, 1953 E. P. RUDKIN 2,624,838

RADIO RECEIVER EMPLOYING BAND PASS COUPLING CIRCUIT ARRANGEMENTS

Filed Jan. 14, 1947 6 Sheets-Sheet 1

Inventor
ERIC PETER RUDKIN
By R.P. Morris
Attorney

Jan. 6, 1953 E. P. RUDKIN 2,624,838

RADIO RECEIVER EMPLOYING BAND PASS COUPLING CIRCUIT ARRANGEMENTS

Filed Jan. 14, 1947 6 Sheets-Sheet 2

Inventor
ERIC PETER RUDKIN
By R. P. Morris
Attorney

Inventor
ERIC PETER RUDKIN
By R. P. Morris
Attorney

Jan. 6, 1953 E. P. RUDKIN 2,624,838

RADIO RECEIVER EMPLOYING BAND PASS COUPLING CIRCUIT ARRANGEMENTS

Filed Jan. 14, 1947 6 Sheets-Sheet 4

Inventor

ERIC PETER RUDKIN

By [signature]

Attorney

Jan. 6, 1953

E. P. RUDKIN 2,624,838

RADIO RECEIVER EMPLOYING BAND PASS COUPLING CIRCUIT ARRANGEMENTS

Filed Jan. 14, 1947

6 Sheets-Sheet 5

Inventor

ERIC PETER RUDKIN

By R. P. Morris

Attorney

Jan. 6, 1953 E. P. RUDKIN 2,624,838

RADIO RECEIVER EMPLOYING BAND PASS COUPLING CIRCUIT ARRANGEMENTS

Filed Jan. 14, 1947 6 Sheets-Sheet 6

Inventor
ERIC PETER RUDKIN
By R. P. Morris
Attorney

Patented Jan. 6, 1953 2,624,838

UNITED STATES PATENT OFFICE 2,624,838

RADIO RECEIVER EMPLOYING BAND PASS COUPLING CIRCUIT ARRANGEMENTS

Eric Peter Rudkin, London, England, assignor to International Standard Electric Corporation, New York, N. Y., a corporation of Delaware Application January 14, 1947, Serial No. 721,903
In Great Britain December 7, 1945

Section 1, Public Law 690, August 8, 1946
Patent expires December 7, 1965

5 Claims. (Cl. 250—20)

Figure 1:
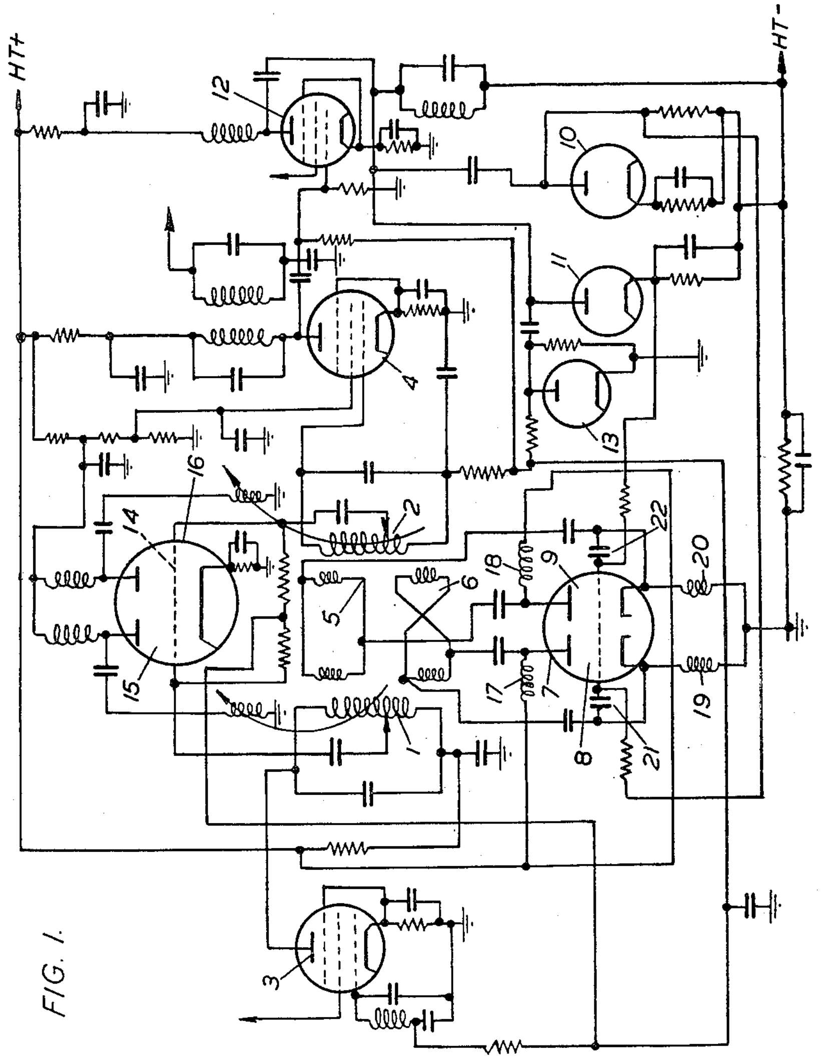

This invention relates to band pass coupling circuit arrangements and has for its object to provide improved band pass coupling circuit arrangements of variable selectivity and signal transmission.

Though not limited to its application thereto, the invention is primarily intended for use in the carrier frequency stages of a radio or like receiver, for example, in the radio frequency stages thereof or preferably in the intermediate frequency stages in the case of a superheterodyne receiver.

In its preferred embodiment the invention provides band pass circuit arrangements wherein selectivity and signal transmission are automatically varied in dependence upon received signal strength that is to increase or decrease both together, the increased selectivity and signal transmission accompanying decrease of signal strength. Such automatic functioning is of great advantage in radio receivers since in general maximum gain and maximum selectivity are required together when the received signal is weak whereas when the received signal is strong interference will normally be at a minimum, high gain will not be required to the same extent and reduced selectivity will result in better reproduction.

According to this invention a variable band pass filter comprises at least two coupled resonant circuits, means for varying the coupling between said circuits, means for applying regeneration to at least one of the said circuits and means conjointly operated with the variation of coupling for controlling the regeneration so as to reduce the regeneration simultaneously with the increase in coupling and vice versa.

The conjoint variation of the coupling and regeneration may be effected manually or under the control of a control signal. In the case of a radio receiver, however, the conjoint variation is preferably effected under the control of the received signal strength in such manner as to reduce the regeneration and increase coupling as a result of increase in received signal strength.

The coupling may be effected in various different ways. For example, a band pass filter in accordance with this invention may comprise two resonant circuits inductively coupled by two link circuits arranged to transfer energy in opposite phase from one resonant circuit to the other, the link circuits being provided with adjustable damping means subjected to differential control so that as the damping in one is increased that in the other is decreased, thereby providing the required variation in coupling between the said resonant circuits. In an embodiment of this nature regeneration may be applied by means of one or more feed back tubes associated with the circuits so as to provide control of regeneration conjointly with control of coupling.

In another embodiment of the invention coupling between the resonant circuits is effected by a pair of tubes one of which transfers energy in the forward direction, that is to say, from primary to secondary and the other of which transfers in the reverse direction, that is to say, from secondary to primary. These tubes are controlled as to their conductances thereby effecting control of the coupling. In an arrangement of this nature the tubes are preferably provided with a pair of grids working in opposite phase and differentially controlled by the control signal or voltage so that conditions approaching zero coupling can be attained. Conjoint regeneration control may be effected by means of auxiliary tubes or by means including the main amplifier tubes between which the band pass filter as a whole produces coupling. Another way of carrying out the invention is to employ a tube as a coupling element between primary and secondary tuned circuits and to control the conductance by applying the control signal or voltage to a grid thereof. In this type of arrangement feed-back of any desired phase may be introduced between output and input electrodes of the tube so as to cause it to present a variable inductive or capacitative reactance whose magnitude varies in dependence upon the control voltage.

It is of course possible to carry out the invention by electro-mechanical means, e. g. a variable coupling condenser may be employed for "top-end" coupling, the said condenser being controlled by a motor, solenoid or other suitable electro-magnetic means in response to the control or signal voltage.

The invention enables wide variations in selectivity and signal transmission to be attained; indeed where a plurality of band pass filters in accordance with this invention are employed in cascaded stages of a radio receiver, the overall maximum selectivity attainable in practice may readily be made as great or substantially greater than that of a quartz crystal.

In the accompanying drawings Figs. 1 through 7 show various forms of coupling circuits embodying the invention.

Figure 4:
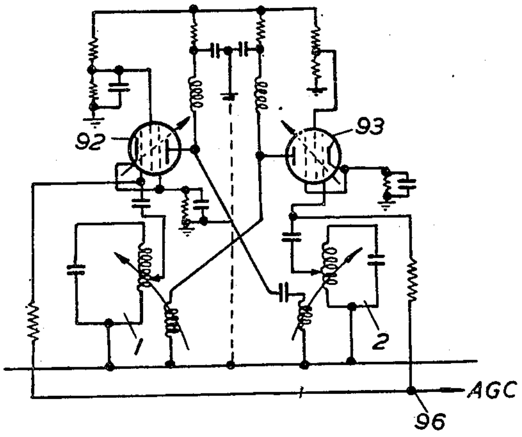
Figure 5:
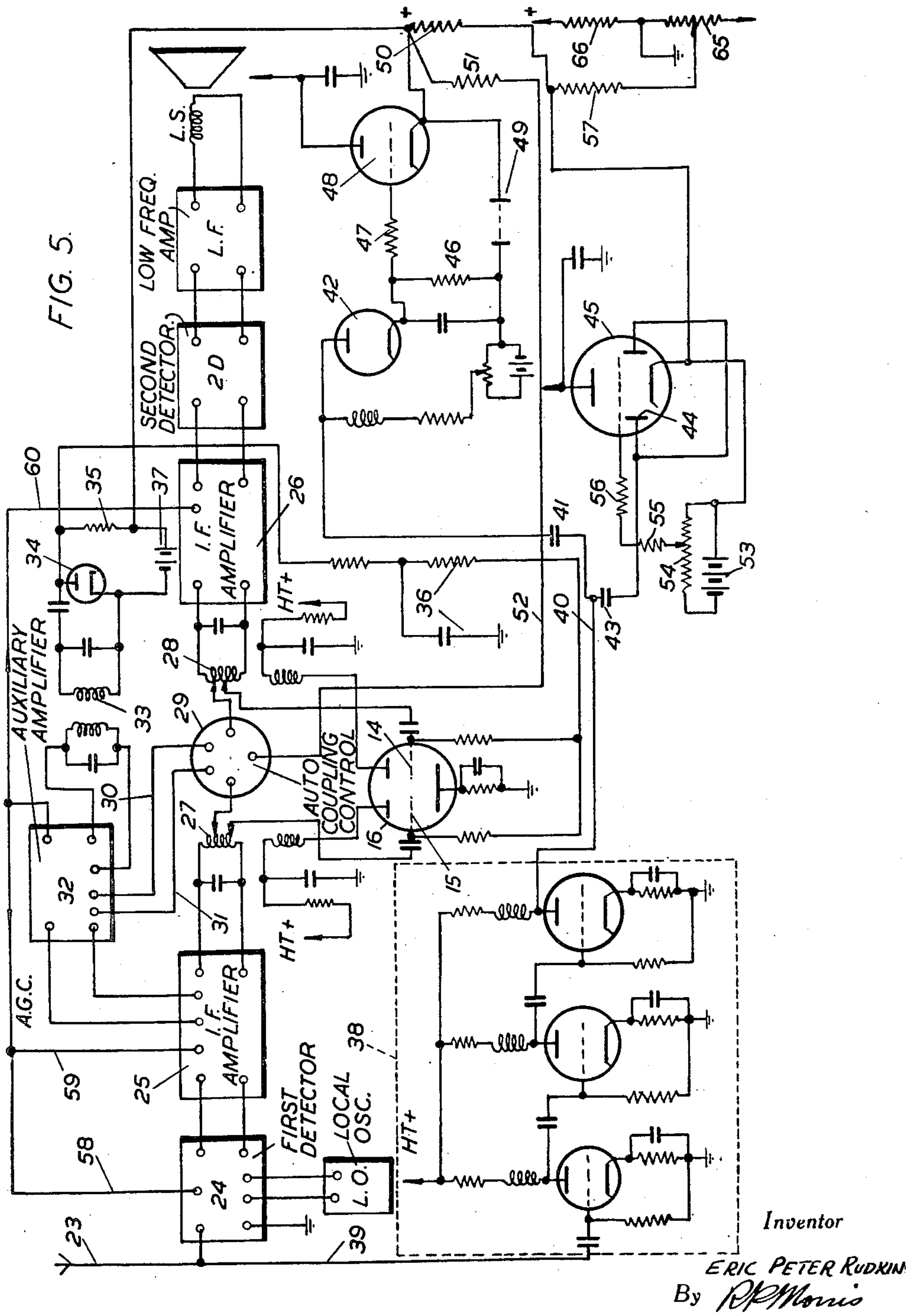
Figure 6:
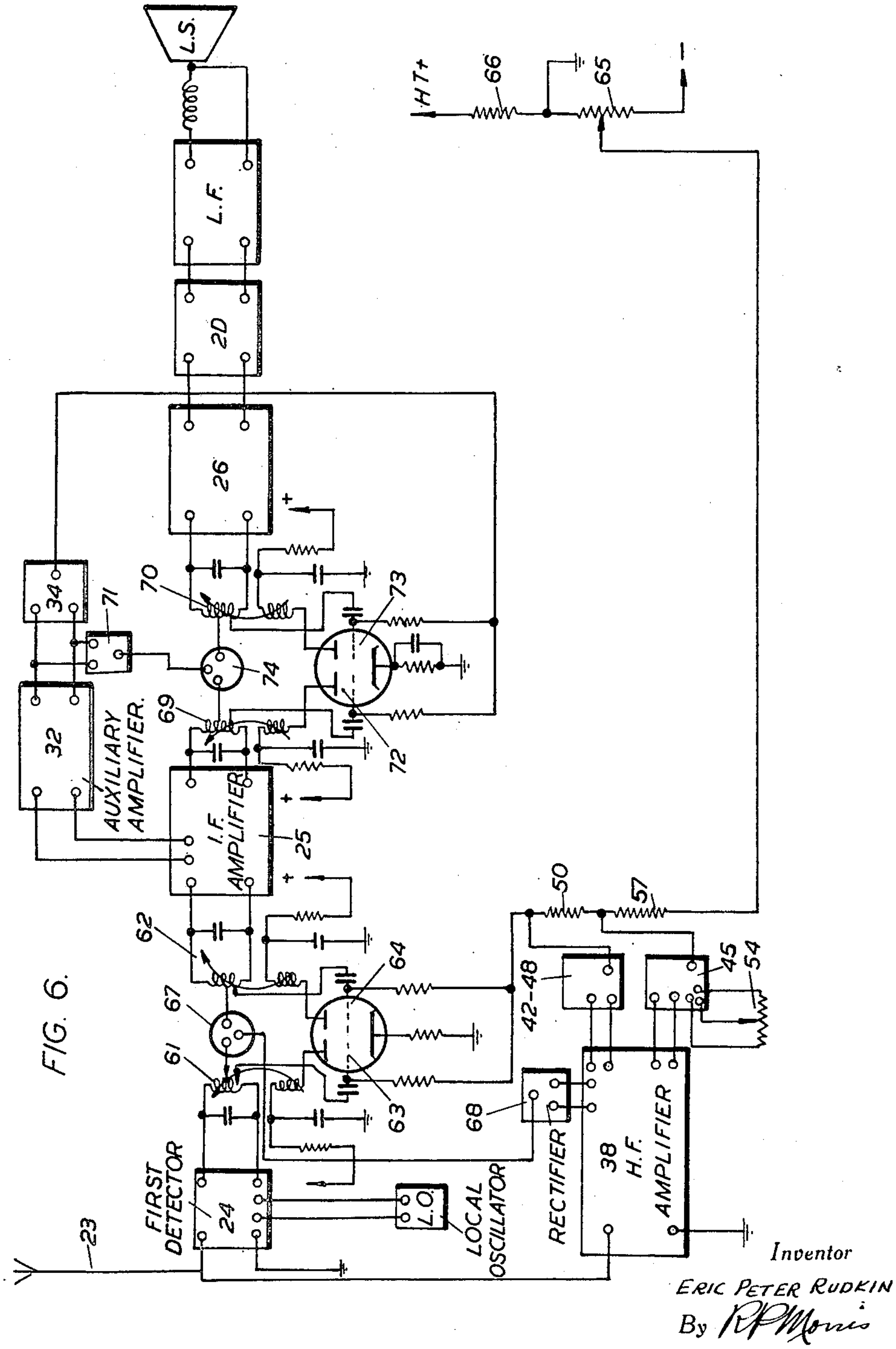
Figure 7:
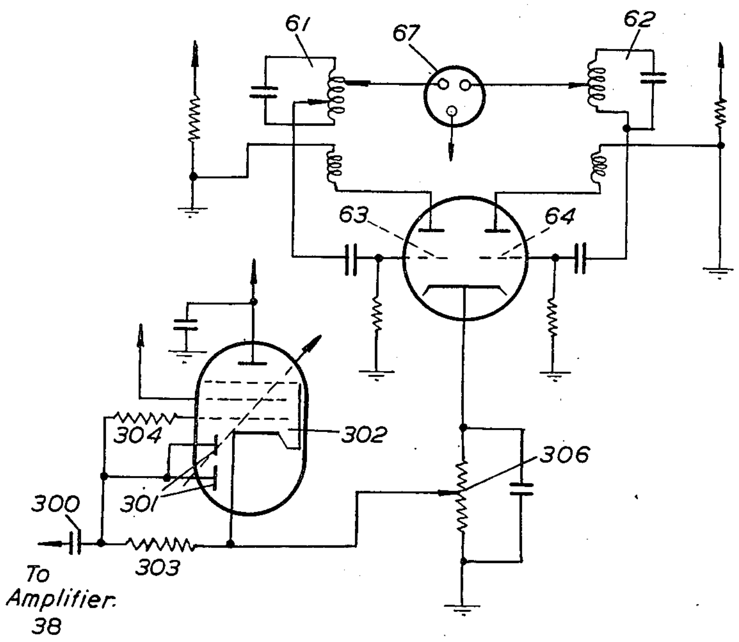

Referring to Fig. 1, two amplifiers 3, 4 which may be regarded as intermediate frequency amplifiers in a radio receiver though, of course, they may be in a carrier frequency amplifier to which it is desired to apply the invention, are coupled by means of a band pass filter comprising resonant primary and secondary circuits 1, 2 linked by circuits 5, 6 which transfer energy in opposite phase in relation to one another. Variable damping is provided in the linked circuits by means of tubes 8, 9 shown as in a common envelope 7, the anode cathode paths of these tubes providing the damping. The anode cathode impedances of the damping tubes are controlled by differential D. C. potentials applied to their grids, the said potentials being derived by rectifiers 10, 11 in dependence upon the signal strength in the main anode circuit of the tube 4, the signal at this point being amplified by an auxiliary amplifier tube 12 before being fed to the rectifiers. The main amplifier tubes 3, 4 are subjected to automatic volume control applied from a further diode rectifier 13 in manner well-known per se. Regeneration is separately applied to the primary and secondary circuits 1, 2 by means of tubes 14, 15 shown in a common envelope 16 the regeneration tubes 14, 15 receiving automatic volume control voltage applied to their grids and derived from the rectifier 13. In order to ensure sensitive control the link circuits 5, 6 are preferably of large inductance and coupled fairly tightly to the circuits 1, 2. Chokes 17, 18, 19 and 20 are preferably provided to maintain the anodes and cathodes of the damping tubes 8, 9 at high frequency potential. The condensers 21, 22 between their grids and cathodes prevent the damping tubes from acting as radio frequency amplifiers. The circuit is so adjusted that in the absence of any signal the link circuits 5, 6 are only very slightly unbalanced so that the coupling between circuits 1 and 2 is at a minimum. In this condition the damping tubes are of approximately equal impedances, both tubes operating substantially at the middle of the straight portion of their characteristics. Also in this condition the regeneration tubes 14, 15 are at maximum gain which is sufficient to provide regeneration such as will bring the band pass filter as near to zero resistance as is consistent with the avoidance of oscillation. This is the maximum signal transmission and maximum selectivity condition. With increase in signal strength negative control voltages are developed in the load circuits of the diodes 10 and 13 and a positive voltage is developed in the load resistance of the diode 11. Accordingly the impedance of tube 8 rises and that of tube 9 falls thereby increasing the damping in link circuit 5 and decreasing that in link circuit 6 so that selectivity is reduced. The simultaneous increase in negative AVC voltage reduces the regeneration provided by tubes 14, 15. The net result therefore is to widen the band passed while maintaining a substantially flat topped characteristic without marked humps at the resonant frequencies of the primary and secondary circuits. If desired series or shunt resistances may be provided in the resonant circuits 1, 2 so as to increase to any desired extent maximum damping provided by the filter in the condition of minimum reaction. With damping resistances provided in this way it is possible to achieve a very wide range of selectivity variation from a band pass of about ⅓ kc. wide to a band pass of the order of 20 kc. wide. The automatic control in the arrangement for Fig. 1 may if desired be effected by a voltage obtained from a signal or band of signals other than the received signal to be reproduced. This may be effected by supplying the rectifiers 10, 11 and 13 from circuits responsive to a frequency different from that of the circuits 1, 2, for example from a tuned circuit or circuits responsive to an interfering signal which it is desired to eliminate from the receiver output, or from an aperiodic amplifier responsive to any frequency band it is desired to eliminate from the receiver output. Thus in a further modification of Fig. 1 a separate aperiodic amplifier responsive substantially only to static disturbances may be employed to feed a rectifier similar to 10, 11 and 13 which are arranged to produce a control voltage in reverse sense. This control voltage is either superimposed on the main selectivity control voltage applied to the grids of tubes 8, 9, 14 and 15 or applied to separate additional grids therein. Accordingly transient static disturbances will automatically cause instantaneous increase in selectivity with the result that noise interference by such disturbances is reduced while the normal selectively regeneration control is unaffected in the absence of such disturbances. Figs. 5, 6 and 7 of the drawings show a number of embodiments in which the invention is employed to reduce or eliminate the results of static and like interference and it is convenient to describe these embodiments before reverting to the description of Figs. 2 through 7.

In order to employ the invention to provide improved reception in the presence of static or similar interference it is required to obtain automatically, in response to the static or interfering signal, an increase in the degree of regeneration applied to the band pass filter circuits and a simultaneous decrease in the coupling. At the same time the arrangement must be such that the circuits will not be thrown into a state of self-oscillation as a result of the occurrence of powerful static. Broadly speaking there are two ways of ensuring this. The first method is so to design the circuits that the self-oscillation point is approached only in the presence of the most powerful static likely to be encountered in practice. This method has the obvious disadvantage that, since maximum regeneration and minimum coupling are achieved only as a result of the most powerful static the results attained in the presence of less powerful static, though a considerable improvement over what would be obtained without the invention, are not as good as are attainable. The second, and preferred method is to design the circuits so that the self-oscillation point is approached in response to static of pre-determined medium strength and to prevent static of greater strength producing oscillation by providing a limiter circuit arrangement whereby the control voltage producing regeneration increase and resulting from static exceeding this pre-determined strength is caused to be no greater than that resulting from the said pre-determined strength whereas the control voltage producing coupling decrease remains proportioned to the interfering static strength. Such a limiter circuit arrangement may be included at any convenient point in an aperiodic amplifier provided for the purpose of producing a control voltage from the static so that the said control voltage is proportioned to the static until a pre-determined, limiting strength is reached. Alternatively the limiter may be associated with a rectifier producing the interference control voltage so that the rectified control voltage cannot exceed a pre-determined value.

Fig. 5 shows diagrammatically a superheterodyne receiver embodying the invention and incorporating an automatic static operated control as above described.

Figure 2:
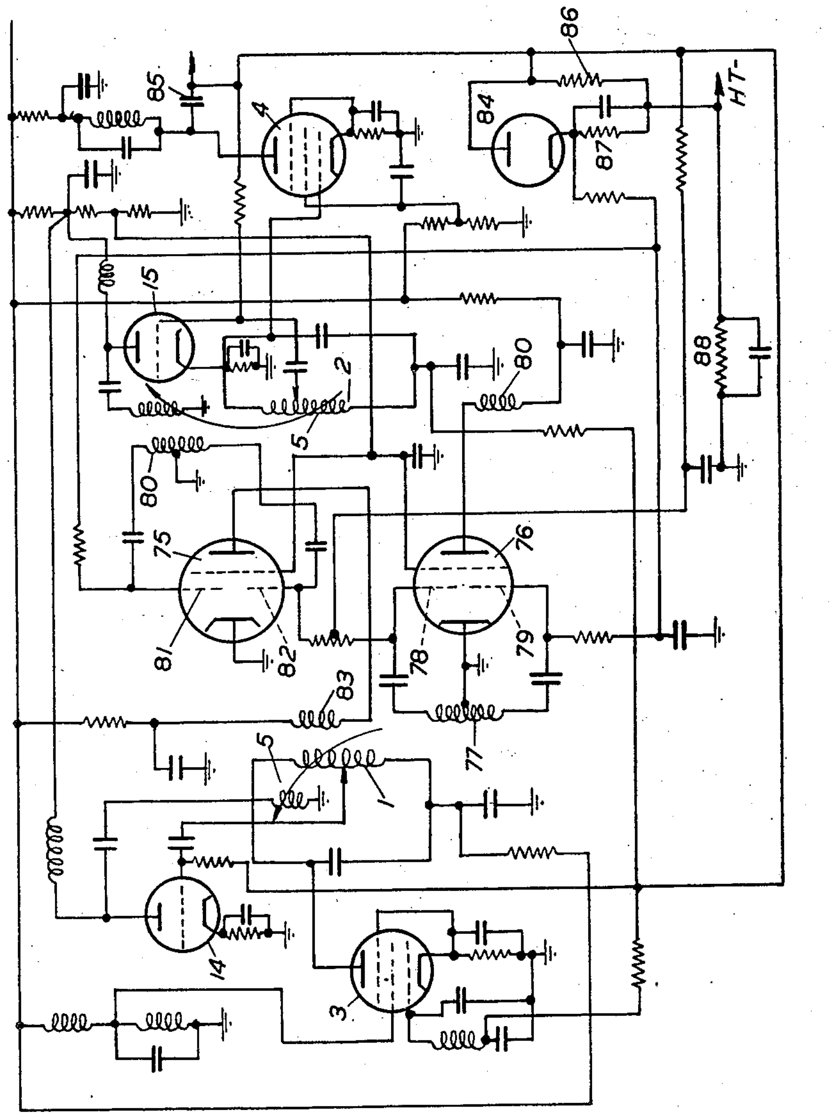
Figure 3:
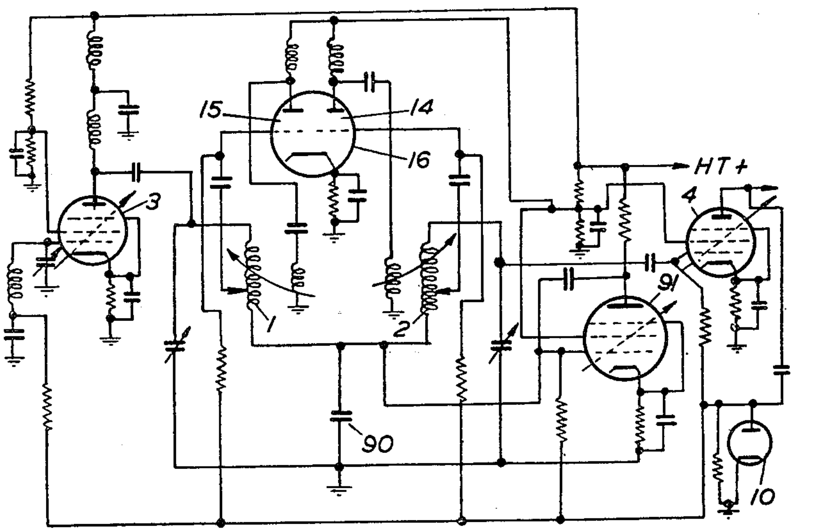

Referring to Fig. 5, signals received on the aerial 23 are fed to the first detector 24, associated with a local oscillator LO, to produce in the well known way an intermediate frequency (IF) which is passed to the first part 25 of an I. F. amplifier. The I. F. amplifier has a second part 26 which is coupled to the first through a filter arranged in accordance with this invention and comprising two tuned circuits 27, 28. More than one pair of tuned circuits may be provided if desired but, for simplicity in explaining the invention, only one pair is shown. The automatic coupling control means between the circuits 27 and 28 is represented diagrammatically at 29 and may take any of the forms described with reference to Figs. 1 to 4. (Fig. 1 has already been described; Figs. 2, 3 and 4 will be described later herein.) The coupling provided thereby is varied automatically under the control of a differential control voltage fed thereto by leads 30, 31 and obtained in an auxiliary amplifier 32 whose input is connected to a suitable point in the output of the I. F. amplifier section 25. The variation in coupling thus obtained is, of course, dependent on received signal strength as already described. The amplifier 32 is also connected through an I. F. band pass filter 33 to a rectifier 34 having a load resistance 35. Negative control voltage proportional to the strength of the desired signal and developed across resistance 35 is supplied via a resistance-capacity filter 36 to the control grids of regeneration triodes 14, 15 shown in a common envelope 16 and operating as already described. So called "delay" in the operation of the rectifier 34 is provided by a potential source 37 shown as a top on a voltage divider connected across a battery. The parts of the receiver so far described operate to give automatic control of coupling and regeneration, decreasing the former and increasing the latter as the signal strength reduces and vice versa so that the overall band width varies directly with received signal strength. In addition to this automatic control in dependence upon desired signal strength the receiver also embodies a measure of automatic control in dependence upon static or like interference. This further automatic control means includes an amplifier 38 responsive to a band of frequencies in which the static or other undesired signals lie. It is to be understood that the undesired signals might be those of adjacent interfering channels in which case the amplifier 38 would include selective circuits tuned slightly above and slightly below the desired I. F. in addition, of course, to the necessary frequency changing circuits (not shown) for bringing the incoming undesired adjacent channel signals to I. F. values slightly above or slightly below (as the case might be) the I. F. obtained (for a given local oscillator setting) from a desired signal. Where the undesired signals are static the amplifier 38 would be an aperiodic amplifier. If both adjacent channel and static interference is to be dealt with, the amplifier 38, which is purely diagrammatically represented, might include both aperiodic and selective circuits. In the present example it will be assumed that static or similar interference is to be dealt with and that the amplifier 38 is aperiodic.

Amplifier 38 receives its input over lead 39 and its output is connected over lead 40 and condenser 41 to an interference control voltage producing rectifier 42. The output of the amplifier is also connected through condenser 43 to the diodes 44 of a double-diode-triode limiter valve 45. Positive control voltage proportional to the strength of an interfering signal is developed at the cathode end of load resistance 46 and fed through filter resistance 47 to the grid of a D. C. amplifier control valve 48 which is biassed to or near cut-off by an adjustable potential source 49. Amplified positive control voltage developed at the cathode end of the cathode load resistance 50 is applied in series with control voltage developed by rectifier 34 to the grids of regeneration triodes 15, 16 by means of a direct connection to the low potential end of resistance 35. The value of load resistance 50 is adjusted to make the gain of tube 48 such that the zero resistance condition in circuits 27, 28 is closely approached in response to an interfering signal of medium strength, the coupling between circuits 27, 28 being at the same time reduced to a minimum by reason of the application of the control voltage developed across resistance 50 to the coupling control means 29 over filter resistance 51 and lead 52. By employing a number of coupled circuits 27, 28 controlled in this way it is possible to ensure that, for the duration of an interfering static pulse of moderate strength, the effective band width of the I. F. amplifier of the receiver is reduced to less than .01 kc. If an interfering static pulse of great strength is received self-oscillation in the I. F. amplifier will still not occur because the action of the limiter 45 prevents the positive control voltage exceeding the value necessary to bring the circuits 27, 28 near the zero resistance condition. So-called delay bias is applied to the diodes 44 from a potential source 53 via potentiometer 54, load resistance 55 and filter resistance 56. The delay bias is adjusted by potentiometer 54 so that diodes 44 will commence to conduct at the predetermined critical interference strength at which circuits 27 and 28 are required to approach the zero resistance condition. For stronger interfering signals the diodes increasingly conduct and apply increasing negative voltage to the grid of the triode section of tube 45, thus decreasing its anode current and decreasing the positive voltage across resistance 57. Since this voltage is superimposed on that applied to the grids of tubes 15, 16 from resistance 50 the result attained is that a maximum net control voltage is produced from an interfering signal of pre-determined strength, a signal of greater strength producing no increase of net control voltage since the voltages from resistances 57 and 50 now tend to offset or neutralise one another. Proper adjustment to secure this result involves correct proportioning of the resistance 57. The triode section of tube 45 should be as similar as possible, electrically, to the tube 48. Preferably the reaction tubes 15, 16 have grids of the variable-mu type (to ensure smooth control action) and obviously they should be initially biassed to about the middle of the curved parts of their control characteristics since an increase in applied negative control voltage from the desired signal channel is required to produce a reduction in regeneration while an increase in positive control voltage from the undesired signal channel is required to produce an increase in the regeneration. To secure quick action the control circuits should be of as low time constants as possible.

The receiver also incorporates automatic gain control (A. G. C.) to maintain substantially constant strength at the input of the second detector 2D. Such A. G. C. means, of any suitable nature known per se, are included in the auxiliary amplifier 32 and provide A. G. C. voltage over leads 58, 59 and 60 to the first detector 24 and the I. F. amplifiers 25 and 26. The usual low frequency amplifier is represented at L. F. and the usual loud speaker at L. S.

In Fig. 5 interference signal control and desired signal control of coupling and regeneration are effected on the same pair of coupled circuits 27, 28. This is not necessary, for control of one pair of coupled circuits may be effected by interference signals and control of another pair may be effected by the desired signals and the two control mechanisms thereby kept entirely separate with consequent obvious advantages from the point of view of the circuit designer. Fig. 6 shows a preferred receiver with such separation of the two forms of control.

Referring to Fig. 6, a pair of coupled circuits interposed in the receiver channel between the first detector 24 and the I. F. amplifier section 25 is subjected to static or other interference signal control by a control voltage obtained in dependence upon the output from the amplifier 38. The regeneration tubes for the circuits 61, 62 are constituted by the triode sections 63, 64 and the control voltage therefor is derived from a rectifier-amplifier-limiter arrangement like that of Fig. 5 and represented in Fig. 6 in block diagram form with reference numerals corresponding to those of Fig. 5. As in Fig. 5 positive control voltage dependent upon the static or like is developed across resistance 50 and opposing limiter voltage (obtained in response to very strong static) is developed across resistance 57, these two resistances being in the control circuit between the grids of triodes 63, 64 and the potentiometer 65 forming the negative arm of the potential divider 66. In the arrangement of Fig. 6, however, the slider of 65 can be adjusted to apply an initial cut-off bias to the grids of 63, 64 or the initial bias can be increased to any desired extent beyond cut-off to prevent interference control from commencing to operate until the interference strength exceeds a predetermined threshold value. As before, adjustment of 54 determines the maximum net control voltage which can be attained however great the interfering signal strength.

The circuits 61, 62 are coupled by an automatically variable coupling device 67 the control voltage for which is derived from a separate rectifier 68 not provided with any limiting action so that the coupling follows unrestricted the amplitude variations of the interfering static or other undesired signals at 38.

The circuits 61, 62 are controlled as described by the undesired signals and automatic control in dependence upon desired signals is effected at the further coupled circuits 69, 70. The regeneration control voltage for these circuits is derived from the rectifier 34 and the coupling control voltage is derived from the rectifier 71, the regeneration triodes being shown at 72 and 73. In the absence of any desired signal the negative control bias on the grids of 72 and 73 is at a minimum producing maximum operating transconductance in these tubes while the circuits 69, 70 are as close to self-oscillation as is consistent with stable operation and the coupling is at a minimum: in other words, with zero signal strength, selectivity and transmission efficiency of circuits 69, 70 are at a maximum. Increase in signal strength produces decreased regeneration and increased coupling.

Instead of obtaining regeneration control by applying positive voltage to the grids of regeneration tubes, the grids may be at fixed D. C. potential (e. g. ground) and control obtained by applying negative control voltage to the cathodes of the tubes, giving them a positive cathode bias from current flowing through a common cathode resistance from an additional control valve whose control grid receives control voltage derived from the static or the like. An arrangement of this nature is illustrated in Fig. 7.

Referring to Fig. 7, the static or other interfering impulses from the last stage of amplifier 38 (not shown) are fed through a condenser 300 to the anodes of diodes 301 forming part of a double-diode pentode 302. Amplified negative control voltage is developed across the load resistance 303 and adjustable resistance 305, forming part of resistance 306, the voltage across resistance 303 being applied through resistance 304 to the control grid of the pentode section of tube 302. This will produce an amplified negative control voltage across resistance 305 which is applied to the common cathode of the regeneration valves 63, 64 shown in a common envelope. The value of resistance 305 is made such that, in the absence of an interfering signal, the current of the valve 302 flowing through 305 biasses the tubes 63, 64 to or slightly beyond cut off in which condition there is no rectified voltage across 303 and the control grid of 302 assumes practically the same potential as the cathode theerof. On receipt of a static impulse a negative rectified potential proportioned to the amplitude thereof is applied to the grid of 302 producing a diminution in the current flow through 305. This will in turn cause a reduction in the positive potential on the common cathode of the tubes 63, 64 and a consequent increase in the regeneration applied to the coupled circuits 61, 62. A simultaneous decrease of the coupling provided by coupling device 67 is produced by means already described with reference to Fig. 9. The advantage of the circuit of Fig. 7 lies in the fact that the negative bias on the grids of tubes 63, 64 with respect to the common cathode can never fall below a predetermined amount, irrespective of the static amplitude, this predetermined bias corresponding to the voltage drop produced across 306 by the combined anode currents of 63 and 64 with the control valve 302 biassed to cut off by the negative control bias derived from the interfering impulses from the anodes of diodes 301. In setting up the system therefore the feed back circuits associated with tubes 63—64 are adjusted to bring the circuits 61, 62 almost to oscillation point with the tube 302 at cut-off and the resistance 305 is adjusted by means of the slider on 306 to bring the tubes 63, 64 to or slightly beyond cut-off, depending on the "delays" required in operation. In this condition, of course, coupling device 67 is adjusted to maximum coupling. Thus, in the presence of static, the band-width acceptance is automatically reduced and thus reducing the noise effect of interference while retaining as much signal intelligibility as is possible.

In the arrangement of Fig. 2 the coupling between circuits 1, 2 is automatically controlled by a pair of tubes 75, 76 each having two grids working in phase opposition, tube 76 having its input coupled to circuit 1 and its output to circuit 2 while tube 75 has its input coupled to circuit 2 and its output to circuit 1. The degree of coupling between circuits 1 and 2 is determined by the conductances of the tubes 75 and 76, these conductances being in turn controlled to produce the desired selectivity variation. In Fig. 2 a center tapped link coupling winding 77 is inductively coupled to circuit 1 and feeds energy in opposite phase to the grids 78, 79 of tube 76 in whose anode circuit is a link coil 80 coupled to circuit 2. Tube 75 has its grids 81 and 82 similarly connected in phase opposition to a center tapped link circuit 80 which is coupled to circuit 2, the anode circuit of tube 75 including a link 83 coupled to circuit 1. The primary circuit 1 is in the anode circuit of amplifier 3 and the secondary circuit 2 feeds into a succeeding amplifier 4. As in Fig. 1, the two tubes 3 and 4 are controlled by automatic control voltage derived from a diode rectifier 84 and which also supplies the selectivity control voltage to the tubes 75 and 76 and the regeneration tubes 14 and 15 which separately supply regeneration to the circuits 1 and 2.

The diode rectifier 84 is fed from the anode circuit of tube 4 via condenser 85 and has load resistances 86, 87 across which are developed negative and positive control voltages respectively. Bias resistance 88 biasses the grids 81 and 82 of tube 75 to the mid-point of their characteristics in the absence of a signal so that in this condition the energy transferred from circuit 1 to circuit 2 via grid 78 is substantially neutralised by that transferred via grid 79. Similar conditions apply in regard to energy transferred from circuit 2 to circuit 1 via tube 75. The load resistance 87 is connected over a smoother network or filter to grids 79 and 81 while the load resistance 86 is similarly connected to grids 78 and 82 of tubes 76 and 75 respectively and also to the grids of the main tubes 3 and 4 and the grids of the regeneration tubes 14 and 15.

In the presence of a signal the conductances of grids 79 and 81 are increased so that energy is transferred by tube 76 from circuit 1 to circuit 2 and also by tube 75 from circuit 2 to circuit 1. At the same time the conductances of the regeneration tubes 14 and 15 are reduced to decrease the amount of regeneration produced. The net result is to increase coupling between circuits 1 and 2 and simultaneously decrease regeneration with increase in signal strength. The tubes 14 and 15 are adjusted as closely to oscillation point as possible in the absence of a signal, the circuits 1 and 2 having a minimum coupling so that the filter presents a narrow single peaked response curve. As in the case of Fig. 1 the selectivity control means may be operated by a signal or band of signals other than those to be reproduced.

In Fig. 3 is shown a modification of Fig. 1 in which the two tuned circuits 1 and 2 are coupled by a condenser 90 connected to ground, which is common to both circuits. The degree of coupling is varied by a conventionally arranged variable reactance tube 91 shunting condenser 90. The negative control voltage produced by the diode 10 is applied to the control grid of the tube 31 for the purpose of varying the reactance in a known manner. This diode also supplies the automatic gain control voltage for the tubes 3, 4 as well as the control voltage for the feedback control tubes 14 and 15, so that the diodes 11 and 13 shown in Fig. 1 are not required.

Fig. 4 shows another coupling arrangement for the tuned circuits 1 and 2 which is in principle similar to that illustrated in Fig. 2. The circuits are coupled by two single tubes 92 and 93. The control grid of tube 92 is connected to a point on the inductance of tuned circuit 1, while the anode is connected as before to a winding 94 coupled to the inductance circuit 2. Likewise, the control grid of tube 93 is connected to a point on the inductance of tuned circuit 2, while the anode is connected to the winding 95 coupled to the inductance of tuned circuit 1. A positive control voltage is applied from the cathode of the diode 84 (Fig. 2) over conductor 96 (Fig. 4) to the control grids of tubes 92 and 93.

In the arrangement of Fig. 4, according to one method of operation, the coupling control valves 92, 93 are initially biassed to cut-off and a positive control voltage proportional to received signal amplitude is applied to the control grids thereof over lead 96, the effective coupling between the circuits increasing with signal strength. For this to operate correctly, slight inductive coupling should exist between the inductances of the primary and secondary circuits, the sense of the coupling being such that substantially no phase change exists in the passage of the signal energy from primary to secondary, that is to say the sense of the mutual coupling involves no phase reversal of the signal energy. The degree of this inductive coupling should be adjusted with the control valves biassed to cut off to provide the minimum coupling required for maximum selectivity. As signal strength increases an increasing positive control voltage is applied to the control grids of valves 92 and 93 producing a progressive increase in the effective coupling between the circuits 1 and 2 and a broadening of the response curve. Regeneration control for either circuit may be effected by separate controlled regeneration tubes in the manner already described.

In an alternative method of operating the arrangement of Fig. 4 the initial inductive coupling between the primary and secondary may be such as to provide a phase reversal of the signal energy from primary to secondary whilst the degree of this coupling should be sufficient to provide the maximum degree of coupling required at minimum selectivity. In this case the initial bias of the tubes should be small or zero and in this condition the constants of the circuits adjusted to bring the circuits to oscillation point. In this condition corresponding to the absence of a signal the effective electronic coupling is a minimum whilst the regeneration is at a maximum. An increasing negative bias voltage is applied to the grids of the tubes proportional to signal amplitude which has the effect of reducing the regeneration whilst simultaneously increasing the effective coupling producing a broadening of the band-width of the system.

The invention is not limited to band pass filters consisting only of two coupled circuits.

Again any of the arrangements shown for control may be used in conjunction with any of the arrangements shown for providing regeneration and the invention is not limited to the particular circuit arrangement shown for these purposes since numerous other modifications will suggest themselves to those skilled in the art.

Further, where required, separate and independently adjustable "delays" may be provided for the control of the regeneration and coupling tubes so that, if required, one control effect may be caused to commence before or after the other.

Such adjustment of individual delay provides wide adjustment of the performance characteristic of a receiver as a whole and will often be found advantageous.

Receivers in accordance with this invention may with advantage incorporate automatic frequency control (AFC) of any form known per se. Such an AFC system operating on the local oscillator of a superheterodyne receiver will automatically correct for any undesired small changes in resonance of the I. F. filter brought about incidentally to coupling and regeneration control. It is also, of course, possible automatically to control the local oscillator to give single side band reception as known per se, the invention being clearly applicable to this type of receiver also.

What is claimed is:

1. In a receiver for the selective reception of a band of frequencies, in combination, a first amplifying stage having an output circuit, a second amplifying stage having an input circuit, electrical coupling means coupling said output and input circuits together to provide interstage coupling between said first and second amplifier stages, said coupling means including electronic discharge means having the main current path thereof connected in series circuit with the electronic discharge means operative to vary the effective coupling impedance and thereby the pass band characteristic of said electrical coupling means, regenerative means connected to said coupling means being operative to vary the strength of a signal received from said coupling means, signal responsive means connected to said first amplifying stage being operative to produce a control electrical variable which varies with the strength of a signal passed by said amplifying stage, circuit means operative to apply said control electrical variable to said electronic discharge means to vary the coupling current flow and hence the effective impedance of the coupling and to said regenerative means to vary the amount of regeneration produced to simultaneously control the band pass characteristics of the coupling, and limiter means electrically coupled between said signal responsive means and said regenerative means and being operative to prevent said regenerative means from producing oscillation.

2. The combination according to claim 1 wherein said coupling means comprise first and second reactive circuits applying energy from said output to said input circuit in opposite phase, said electronic discharge means comprising at least one vacuum tube having the main current path thereof connected in series with one of said reactive circuits to vary the transmission characteristic thereof.

3. In a receiver for the selective reception of a band of frequencies, in combination, a first amplifying stage having an output circuit, a second amplifying stage having an input circuit, electrical coupling means coupling said output and input circuits together to provide interstage coupling between said first and second amplifier stages, said coupling means comprising first and second reactive circuits connected to apply energy from said output to said input circuit in opposite phase and electronic discharge means connected in circuit therewith, said electronic discharge means comprising first and second vacuum tubes connected, respectively in said first and second reactive circuits, said tubes being operatively connected so that the impedance of one of said tubes varies inversely as the impedance of the said other tube to vary the pass-band characteristic of said electrical coupling means, regenerative means connected to said coupling means being operative to vary the strength of a signal received from said coupling means, signal responsive means connected to said first amplifying stage being operative to produce a control electrical variable which varies with the strength of a signal passed by said amplifying stage and circuit means operative to apply said control electrical variable to said electronic discharge means and to said regenerative means to simultaneously control said regenerative means and said coupling means.

4. In a receiver for the selective reception of a band of frequencies, in combination, a first and second amplifying stage, coupling means operative to transfer energy within a selected frequency band between said amplifying stages, said coupling means including variable impedance means operative to vary the degree of interstage coupling provided by said coupling means, regenerative means connected to said coupling means being operative to vary the transmissivity of said coupling means, signal responsive means connected to said first amplifying stage being operative to produce a control electrical variable which varies with the strength of a signal lying outside said frequency band as passed by said amplifying stage, means for varying said impedance means in response to an electrical variable, circuit means operative to apply said control electrical variable to said impedance varying means and to said regenerative means to decrease the impedance thereby reducing the width of said frequency band and increase regenerative means thereby increasing said transmissivity in response to an increase of said signal and to increase the width of said frequency band and decrease said transmissivity in response to a decrease in said signal, limiter means coupled between said signal responsive means and said regenerative means being operative to prevent said regenerative means from reaching an oscillatory state in response to signals exceeding a given strength, additional signal responsive means operatively connected to control the operation of said impedance means in response to a signal lying within said frequency band in such a manner as to reduce the width of said frequency band and increase said transmissivity upon a reduction in the strength of the last mentioned signal and to increase the width of said frequency band and decrease said transmissivity upon an increase in the strength of said signal.

5. In a receiver for the selective reception of a band of frequencies, in combination, a first and a second amplifying stage, coupling means operative to transfer energy within a selected frequency band between said amplifying stages, said coupling means including variable impedance means operative to vary the degree of interstage coupling provided by said coupling means, regenerative means connected to said coupling means being operative to vary the transmissivity of said coupling means, signal responsive means connected to said first amplifying stage being operative to produce a control electrical variable which varies with the strength of undesired signals lying outside said frequency band as passed by said amplifying stage, and circuit means interconnecting said signal responsive means and said impedance and being operative to apply said control electrical variable to said impedance means to vary said impedance in such a manner as to reduce the width of said frequency band in response to an increase of said signal and increase the width in response to a decrease in said signal and second circuit means interconnecting said signal responsive means and said regenerative means to apply said control electrical variable thereto so as to increase said transmissivity in response to an increase of said signal and to decrease said transmissivity in response to a decrease of said signal, and limiter means coupled between said signal responsive means and said regenerative means being operative to prevent said regenerative means from reaching an oscillatory state in response to signals exceeding a given strength.

ERIC PETER RUDKIN.

REFERENCES CITED

The following references are of record in the file of this patent:

UNITED STATES PATENTS

| Number | Name | Date |
|---|---|---|
| 2,234,514 | Barber | Mar. 11, 1941 |
| 2,240,295 | Grundmann | Apr. 29, 1941 |
| 2,248,763 | Kreienfeld | July 8, 1941 |
| 2,255,645 | Bligh et al. | Sept. 9, 1941 |
| 2,255,690 | Wheeler | Sept. 9, 1941 |
| 2,262,707 | Farington | Nov. 11, 1941 |
| 2,360,794 | Rankin | Oct. 17, 1944 |
| 2,388,590 | Zappacosta | Nov. 6, 1945 |
| 2,488,359 | Wheeler | Nov. 15, 1949 |

FOREIGN PATENTS

| Number | Country | Date |
|---|---|---|
| 100,402 | Australia | Mar. 11, 1937 |
| 470,372 | Great Britain | Aug. 13, 1937 |